United States Patent [19]

Burris

[11] 4,298,397
[45] * Nov. 3, 1981

[54] ASPHALT-SULFUR EMULSION COMPOSITION

[76] Inventor: Michael V. Burris, 1760 Industrial Rd., Las Vegas, Nev. 89102

[*] Notice: The portion of the term of this patent subsequent to Jul. 8, 1997, has been disclaimed.

[21] Appl. No.: 139,639

[22] Filed: Apr. 14, 1980

Related U.S. Application Data

[63] Continuation-in-part of Ser. No. 1,536, Jan. 8, 1979, Pat. No. 4,211,575, which is a continuation-in-part of Ser. No. 726,946, Sep. 27, 1976, abandoned.

[51] Int. Cl.$^3$ .................... C08L 95/00; C09D 3/24
[52] U.S. Cl. ........................ 106/274; 106/273 N; 106/277; 106/278; 106/279; 252/311.5; 404/17; 404/79
[58] Field of Search ............... 106/277, 278, 279, 274, 106/273 N; 404/17, 79; 252/311.5

[56] References Cited

U.S. PATENT DOCUMENTS

| | | | |
|---|---|---|---|
| 2,182,837 | 12/1939 | Bacon | 404/79 |
| 2,378,235 | 6/1945 | Miles | 106/273 UX |
| 2,602,029 | 7/1952 | Bradshaw | 106/247 X |
| 3,126,350 | 3/1964 | Borgfeldt | 106/277 X |
| 3,270,631 | 9/1966 | Bower | 106/277 X |
| 3,476,679 | 11/1969 | Fauber | 106/278 X |
| 3,923,537 | 12/1975 | Wood | 106/277 |
| 3,970,468 | 7/1976 | Garrigues et al. | 106/277 X |
| 4,008,096 | 2/1977 | Knapp | 106/277 |
| 4,073,659 | 2/1978 | Burris | 106/278 |
| 4,094,696 | 6/1978 | Burris | 106/277 |
| 4,154,619 | 5/1979 | Pronk | 106/274 |
| 4,211,575 | 7/1980 | Burris | 106/278 X |
| 4,211,576 | 7/1980 | Yan | 106/278 |

*Primary Examiner*—Howard E. Schain
*Attorney, Agent, or Firm*—Seiler & Quirk

[57] ABSTRACT

In a stockpile asphalt emulsion composition an improved asphalt phase comprises 50–98% of paving grade asphalt, 1–10% added sulfur, and 1–35% liquid hydrocarbon.

13 Claims, No Drawings

4,298,397

ASPHALT-SULFUR EMULSION COMPOSITION

REFERENCE TO OTHER APPLICATIONS

This application is a continuation-in-part of co-pending application Ser. No. 1,536, filed Jan. 8, 1979, now U.S. Pat. No. 4,211,575 which in turn is a continuation-in-part of Ser. No. 726,946, filed Sept. 27, 1976, now abandoned.

BACKGROUND OF THE INVENTION

In order to achieve a suitable stockpile mix composition, used for repairing asphaltic concrete surfaces, such as potholes, and the like, usually caused by weather and temperature variations, the material is desirably of a high stability, where it may be stockpiled for substantial periods of time, and still be workable. Thus, such a composition is to be soft enough, even during cold temperature conditions, to be removed from the stockpile and worked into the surface area to be repaired, without being heated in an apparatus. At the same time, the composition must have a stability to prevent it from becoming easily deformed or rutted by automobile traffic in warm weather. Thus, these two criteria are desirably achieved in improved stockpile compositions.

In my aforesaid co-pending application, there is disclosed an improved asphalt emulsion composition for the purpose of achieving a stockpile mix which may be stored for substantial periods of time, and still remain soft enough for use, even in cold weather conditions. These compositions comprise an asphalt emulsion having an asphalt phase incorporation 10-50% sulfur and 5-30% of a liquid petroleum hydrocarbon, in addition to paving grade asphalt. The compositions of the present invention incorporate substantially the same ingredients, but with lower amounts of sulfur to achieve suitable stockpile mixes.

SUMMARY OF THE INVENTION

The asphalt emulsion of the present composition comprises the use of sulfur mixed in the asphalt phase together with a hydrocarbon softening agent to achieve an asphalt material which is emulsified to provide a superior stockpile mix product. The sulfur is mixed in critical proportions with a paving grade asphalt, and to which a liquid hydrocarbon, also in specific proportions is mixed. The materials are also mixed in a preferred high temperature process, above the melting point of sulfur, but below a critical temperature at which chemical reaction between the sulfur and asphalt will occur. Specific materials including emulsifiers, petroleum hydrocarbon softening agents, and the like will be described hereinafter as will the process for preparing the improved composition of the invention.

DETAILED DESCRIPTION OF THE INVENTION

In preparing the composition of the present invention, the asphalt phase is of significant importance. The asphalt phase is made up of asphalt, sulfur and a liquid petroleum hydrocarbon softening agent. The ingredients are mixed in critical proportions, and preferably at elevated temperature conditions.

The asphalt used in the asphalt phase of the composition is a paving grade asphalt, also referred to in the art as an "aged residue" (AR) grade. The asphalt is used in amounts of between about 50 and about 98%, by weight, of the asphalt phase. The common available AR grades of paving asphalt are AR-1000, AR-2000, AR-4000, AR-8000, and AR-16000. The numerical designation is the median viscosity of the asphalt at 140° F. (60° C.) in poises after aging. These paving asphalts are sometimes also referred to as penetration grade asphalts, having original penetrations at 77° F. (25° C.) of between about 40 and about 300 dmm. The preferred asphalts used in the invention are the softer paving asphalts, specifically the AR-4000, 2000, and 1000 grade materials. The improved results from the combination of sulfur and petroleum hydrocarbon in the asphalt are realized regardless of whether the asphalt has a high or low residual sulfur. The use of liquid asphalts are excluded from the present invention because of the substantial amounts of solvents used in their preparation.

Elemental sulfur is used in its commercial or technical grade, usually in flour or particulate form. The sulfur is mixed with the asphalt to achieve a substantially homogeneous mixture, which is most difficult or impractical at ambient temperatures. The amount of sulfur to be mixed with the asphalt is between about 1 and about 10%, by weight, of the asphalt phase. Preferably, the amount of sulfur used is between about 2 and about 10%, to achieve the desired emulsion composition characteristics. Thus, according to the invention, the sulfur is added in the above amounts, regardless of the sulfur content present in the asphalt used preparing the compositions herein.

Optionally, a portion, or all of the sulfur may be a modified sulfur, comprising the reaction product of elemental sulfur with dicyclopentadiene. Such a product is particularly advantageous where unpleasant sulfur odors are undesired, for environmental or air pollution control reasons, especially in urban areas. The modified sulfur composition is prepared by reacting sulfur with dicyclopentadiene at a temperature above the sulfur melting point, i.e., between about 200° and about 300° F. Preferably, reaction temperatures are kept below about 280° by adding the dicyclopentadiene to the molten sulfur in small increments. The amount of the diene used may depend on the desired odor reduction, with up to about 21%, by weight, being preferred, and between about 1 and about 10% especially preferred. For example, a modified sulfur composition consisting of sulfur and 5%, by weight, cyclopentadiene is practically odorless, and may be stored indefinitely. The reaction product includes polymeric polysulfides, and free, unreacted sulfur. A commercially available material is Escopal, a cyclic diene product containing dicyclopentadiene, and marketed by Exxon.

The liquid petroleum hydrocarbon softening agent is one having a boiling point above about 200° F. and preferably above about 350° F. By such a limitation, it is intended to exclude the lower boiling gasolines, but to include kerosene, naphtha, and the like. Preferred materials boiling above 350° F. include gas oil and fuel oil. Gas oil is a petroleum distillate having a viscosity and boiling range between kerosene and lubricating oil, normally between about 355° and 800° F. Such a gas oil also preferably has an API gravity of between about 10° and about 30°. Fuel oils, specifically Nos. 2–6 fuel oils, having a boiling range of about 400° F. and above are also preferred. Especially preferred are the viscous No. 5 and No. 6 fuel oils, sometimes referred to as bunker fuels. No. 5 bunker light has a viscosity of 26.4–65 cs (centistokes) at 100° F., and No. 5 heavy viscosity of 65–194 cs. No. 6 bunker has a viscosity of 92–638 cs at 122° F. In addition to these oils, particularly highly aromatic, low viscosity, low volatility petroleum fractions such as obtained from thermally cracked residues, high boiling fractions of catalytically cracked gas oil, boiling fractions of cracking cycle stocks. Residues from pyrollysis of residual petroleum fuel oils used in the production of gas and the like, and highly aromatic extracts of distillate oils used in making lube oils. Preferred members of the latter group include the high boiling extracts obtained by use of nonreactive highly polar, aromatically preferential solvents such as liquid sulfur dioxide, phenol, cresylic acid, beta(-)dichloroethyl ether, nitrobenzene, etc. The use of the so-called double solvent process employing mutually immiscible solvents like cresylic acid and propane also yields suitable extracts. The useful hydrocarbon fractions may contain paraffinic unsaturated and napththenic compounds, but are predominantly aromatic, that is, they contain above about 55% and preferably above 65% aromatics by weight. Viscosities of these materials may range from about 35-150 SSU at 210° F. to 75 to more than 13000 SSU at 100° F. In general, the most preferred petroleum hydrocarbon fractions have a viscosity-gravity constant (VGC) about 0.905 and initial boiling points above about 350° F. and preferably above 500° F. Mixtures of these hydrocarbons may also be used. More preferably, initial boiling points of the hydrocarbon compositions are above about 500° F. with flash points (c.o.c.) above about 300° F. Typical of these hydrocarbons are "Dutrex" oils available from Shell Chemical Co.

The amount of liquid petroleum hydrocarbon used in the asphalt phase of the composition is between about 1 and about 35%, by weight. Preferred amounts are in the 2-20% range, so as to achieve a stockpile composition having desired penetration and softening point characteristics. It has also been found, according to the invention, that the oil is preferably mixed with the material after the asphalt and sulfur have been combined. For example, where the oil is mixed with the asphalt prior to or at the time of sulfur addition, the amount of sulfur which can be held in suspension in the asphalt phase is reduced, because of the reduced viscosity of the composition when the liquid hydrocarbon is added.

In preparing the asphalt phase, although sulfur may be mixed with asphalt at ambient temperatures, the preferred process is accomplished at elevated temperatures. Specifically, the asphalt and sulfur are independently heated above about 200° F. and up to about 300° F., the sulfur being heated to the molten state, and materials are then blended together. In the blending, the same elevated temperatures should be maintained so that the sulfur remains molten thereby substantially improving the mixing of the two ingredients. However, temperatures of about 305° F., and above, are to be avoided because sulfur begins to chemically react with the asphalt, causing dehydrogenation and producing hydrogen sulfide. It is only after the desired amount of sulfur has been melted and mixed with the asphalt, that the liquid petroleum hydrocarbon is introduced and blended. The temperature of the composition at this time may be maintained, so long as substantial volatilization of the hydrocarbon is avoided. However, temperatures above the melting point of sulfur, about 230°-235° F., will further allow improved mixing of the ingredients.

Following preparation of the asphalt phase, the emulsion is prepared. In preparing the emulsion, a minor amount of water is used in which is incorporated a sufficient amount of emulsifier to achieve a stable emulsion. The emulsifiers may be cationic, anionic, nonionic, or mixtures thereof. The preferred cationic emulsifiers are those selected from the group consisting of lignin amines, quarternary ammonium halides, amine acetate salts and alkyl-substituted imidazolines. The lignin amines are amine-type products derived from lignin reacted with a primary or secondary amine and formaldehyde or other aldehydes and ketones such as acrylaldehyde, benzaldehyde, acetaldehyde, acetone, etc. The lignin is obtained from materials such as wood, straw, corn cobs and the like and is extracted by known methods such as pulping the wood, the sulfate method, soda method, acid hydrolysis and solvent extraction. The amines reacted with the lignin may be any suitable primary or secondary means, for example, dimethylamine, butylamine, isopropylamine, and the like. More specific reference preparation of these cationic amine emulsifiers are disclosed in U.S. Pat. No. 2,863,780 and are well known to those skilled in the art. A commercially available product in this group is Indolin W-2.

Another preferred group of cationic emulsifiers are the alkyl-substituted imidazolines, wherein one of the alkyl groups has between 12 and 24 carbon atoms and the other substituted alkyl groups have between 1 and 4 carbon atoms. Examples of these emulsifying agents are:
1-(2-aminoethyl)-2(4-tetradecenyl)-4,5-di-n-butyl-2-imidazoline,
1-(2-aminoethyl)-2-n-octadecyl-4-ethyl-2-imidazoline,
1-(2-aminoethyl)-2-n-eicosyl-2-imidazoline,
1-(2-aminoethyl)-2-(12-heptadecenyl)-2-imidazoline, and
1-(2-aminoethyl)-2-(5,7-heptadecadienyl)-2-imidazoline
Commercial products of this type are Tyfo K, "Nalcamines" and "Nalquats" such as Nalcamine CAE, a mixture of 1-(2-aminoethyl)-2-n-aliphatic-2 imidazolines where the aliphatic groups are heptadecenyl and heptadecadienyl. Other cationic emulsifiers may be used such as salts of primary aliphatic amines sold as "Armeens."

Other cationic emulsifiers include the quarternary ammonium halides such as the chlorides salts having the general formula

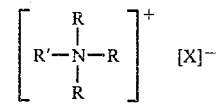

where R' group is a long alkyl chain, of between, for example, 12 and 24 carbon atoms and the remaining R groups are shorter alkyl or benzyl radical in order to impart oil solubility. The X moiety is a halide, preferably chloride or bromide, although other salts such as hydroxide, nitrate, sulfate, acetate and the like may be used. Examples of emulsifiers within this group are as follows:
cetyltrimethylammonium bromide,
cetyldimethylethylammonium bromide,
n-dodecyltrimethylammonium chloride,
n-dodecyltrimethylammonium hydroxide,
n-tetradecyltrimethylammonium chloride,
n-octadecyltri-n-butylammonium nitrate,
n-hexadecyltrimethylammonium chloride,
n-tetracosyltrimethylammonium acetate,
n-docosylpropyldimethylammonium chloride, n-tetradecyl-n-heptyldimethylammonium chloride,
n-heptadecyldipropylmethylammonium chloride,
n-hexadecylethyldimethylammonium chloride,
n-pentadecylbenzyldiethylammonium fluoride,
n-nonadecyldiethylmethylammonium sulphate, and
p-diisobutylbenzyltrimethylammonium chloride. Commercially available compositions of this type include, for example, Hyamine 2389 (methyldodecylbenzyltrimethylammonium chloride), Aliquat 26 (monotallowtrimethylammonium chloride) or Emcol-11, an N-alkylbenzyl N,N,N-trimethyl ammonium chloride with the alkyl group averaging 12 carbon atoms, "Arquad T" and "Arquad S," $C_{14}$-$C_{18}$ trimethyl ammonium chlorides with the alkyl groups of tallow and soybean oils, respectively.

The amine acetate salt emulsifying agents are the primary aliphatic amine acetate salts sold under the trademark "Armac." These amines are derived from primary, secondary or tertiary amines in which the aliphatic groups are alkyl groups ranging from about 8 to about 18 carbon atoms.

Suitable anionic emulsifiers include petroleum sulfonates, specifically alkaryl sulfonates such as alkali metal salts of methylnaphthalene sulfonate, o-dodecylbenzene sulfonate, mixtures of petroleum sulfonates, and the like, or sulfates such as n-hexadecyl sulfate, and the like. Suitable soap-type emulsifying agents include alkali metal salts of higher fatty acids, especially those having at least 8 carbon atoms in the molecule such as lauric, myristic, palmitic, oleic, ricinoleic, linoleic acids and the like, and mixtures of acids available from animal or vegetable oils, well known to those skilled in the art.

Nonionic emulsifying compositions include materials having long chains of polyoxethylene or polyoxypropylene in fatty acid, alcohol, amide or amine molecule. Useful nonionic emulsifying agents include ethoxylated long chain alcohols, for example, those having alkyl groups of between about 8 and 20 carbon atoms, including fatty alcohols, and ethoxylated alkyl phoenols wherein the alkyl chain or chains each have between about 1 and about 16 carbon atoms. The ethoxylation of these alcohols or phenols is well understood by those skilled in the art and generally consists of reacting ethylene oxide with the basic compound in the desired proportions to achieve the desired ethoxy or ethyleneoxy groups in the molecule. Preferably, the number of ethoxy groups in the compound are between about 10 and about 100, and preferably between about 20 and about 60. The nonionic emulsifiers include ethoxylated nonyl alcohol, decyl alcohol, tridecyl alcohol, etc. Suitable alkyl substituted phenols which are ethoxylated include nonyl phenol, tridecyl phenol, octyl phenol, hexyl phenol, and the like. The commercial emulsifying agents within this group include NP-1007, a 100 mole polyethoxylated nonyl phenol, TDA-40, a 40 mole polyethoxylated tridecyl alcohol, Emery 15666, a 30 mole ethoxylated tridecyl alcohol, Emery NP 407, a 40 mole ethoxylated nonyl phenol, Emery TDA 307, a 30 mole ethoxylated tridecyl alcohol as well as others, again well known to those skilled in the art. For certain uses, mixtures of these above noted types of synthetic detergents or soaps may be used.

The amount of emulsifier used will normally be between about 0.05 and about 10%, of the total composition weight. Usually an amount of between about 0.05 and about 5% by weight will be suitable where the above-described emulsifiers are used. It may also be desirable to substitute or incorporate surface active clay in the emulsion composition, useful as an emulsifying additive or stabilizer for the emulsion composition. If desired, a portion, or all of the emulsifying agent may comprise bentonite or montmorillonite. When used alone, the bentonite may be used in amounts of up to about 10%, preferably between about 3 and about 8%, by weight, of the emulsion. Other clays having surface active properties may also be used, for example, such as hydrated aluminum silicate clays, kaoline, kaolinite, halloysite, and pyrophyllite, and the hydrated magnesium silicate clays such as serpenines, chrysotile, and talc. Although these non-bentonite clays can not be used alone as the sole emulsifier because of insufficient surface active properties, they can be combined with the previously described emulsifiers in any amounts up to about 10% of the total composition, or substituted for up to about 90% of the bentonite.

After the aqueous emulsifier phase is produced by combining the proper amount of emulsifier and water, the proportions of the emulsifier and asphalt phases are thoroughly mixed after which the composition is then blended with suitable aggregate in the desired proportions. The asphalt phase is used in a major amount, over about 50% by weight, of the total composition. Normally, this is accomplished in a pug mill with simply adding sand and/or sized aggregate as desired.

In order to achieve the stockpile mix composition having preferred characteristics, it is important that the asphalt phase have the properties of substantial penetration but a relatively high softening point. Specifically, a preferred asphalt phase has a penetration of at least about 200 dmm at 77° F. and more preferably 300 or more. Such penetrations are measured based on well known tests according to ASTM D-5 or AASHO T-49, well known to those skilled in the art. The asphalt phase should also have a high stability, so that it is not so soft as to be susceptible to rutting when exposed to traffic at relatively warm temperatures. Thus, such a stability is indicated by the softening point of the asphalt phase, ideally being close to the original paving grade asphalt softening point.

The following compositions were prepared to illustrate applications within the scope of the invention. The asphalt phase was produced by heating sulfur and asphalt independently to temperatures above the sulfur melting point but below 300° F., after which the two ingredients were blended thoroughly to achieve substantial homogenity. Thereafter the liquid petroleum hydrocarbon was added to the hot composition and mixed. The asphalt used was an Edington AR-1000, and the hydrocarbon was a #6 bunker fuel oil. The percentage of ingredients as well as penetrations and softening points (ASTM D-36) are set forth in the table hereinbelow. The percentages are given by weight.

| Sample | % Hydrocarbon | % Sulfur | Penetration dmm | Soft. Point (°F.) |
|---|---|---|---|---|
| 1 | — | — | 111.7 | 102.5 |
| 2 | 2.0 | — | 123.7 | 101.5 |
| 3 | 6.0 | — | 154.0 | 99.0 |
| 4 | 10 | — | 190.3 | 96.5 |
| 5 | 15 | — | 265.3 | 83.5 |
| 6 | — | 3.0 | 124.3 | 101.5 |
| 7 | — | 5.0 | 162.7 | 96.5 |
| 8 | — | 8.0 | 205.5 | 98.5 |
| 9 | 2.0 | 3.0 | 148.7 | 100.5 |
| 10 | 6.0 | 3.0 | 192.8 | 94.0 |
| 11 | 15 | 3.0 | 364.0 | 86.5 |

-continued

| Sample | % Hydrocarbon | % Sulfur | Penetration dmm | Soft. Point (°F.) |
|---|---|---|---|---|
| 12 | 2.0 | 5.0 | 192.5 | 96.0 |
| 13 | 6.0 | 5.0 | 238.5 | 89.5 |
| 14 | 10 | 5.0 | 335.5 | 84.5 |
| 15 | 2.0 | 8.0 | 230.7 | 96.0 |
| 16 | 6.0 | 8.0 | 342.5 | 95.0 |
| 17 | 10 | 8.0 | 419.5 | 89.5 |

It will be evident from the above samples that the combination of petroleum hydrocarbon and sulfur yield more than an additive effect in the penetration of the asphalt phase. Thus, the asphalt phase compositions of the invention provide substantially improved stockpile mix compositions. Emulsion compositions utilizing the asphalt phases within the scope of the invention are prepared as described hereinabove to produce the stockpile mix of the invention.

I claim:

1. An asphalt-emulsion composition comprising:
   an asphalt phase consisting essentially of between about 50 and about 98% paving grade asphalt, between about 1 and about 10% added sulfur over and above the amount of any residual sulfur in said asphalt, and between about 1 and about 35% of a liquid petroleum hydrocarbon having a boiling point above about 200° F., and
   a water phase having between about 0.05 and about 10.0%, by weight, based on the total composition, of an emulsifier selected from the group consisting of cationic, anionic, and nonionic emulsifiers and mixtures thereof.

2. The composition of claim 1 wherein said petroleum hydrocarbon has a boiling point above about 350° F.

3. The composition of claim 2 wherein said liquid petroleum hydrocarbon is selected from the group consisting of gas oil, fuel oil, and fluxing oil.

4. The composition of claim 3 wherein said fluxing oil comprises an aromatic hydrocarbon having at least 55% aromatics, by weight.

5. The composition of claim 1 or 2 containing between about 2 and about 20% of said liquid petroleum hydrocarbon.

6. The composition of claim 1 wherein said emulsifier includes a surface active clay.

7. An asphalt composition consisting essentially of a paving grade asphalt, between about 1 and about 10% added sulfur over and above the amount of any residual sulfur in said asphalt, and between about 1 and about 35%, by weight, of a liquid petroleum hydrocarbon having a boiling point above about 200° F.

8. The composition of claim 7 wherein said liquid petroleum hydrocarbon has a boiling point above about 350° F.

9. The composition of claim 8 wherein said liquid petroleum hydrocarbon is present in an amount of between about 2 and about 20%.

10. The composition of claim 1 or 7 wherein said added sulfur comprises elemental sulfur.

11. The composition of claim 1 or 7 wherein said added sulfur comprises a modified sulfur consisting of a reaction product of sulfur and dicyclopentadiene.

12. A method of improving the penetration of an asphalt composition consisting essentially of a paving grade asphalt comprising adding thereto between about 1 and about 10% sulfur, and between about 1 and about 35% of a liquid petroleum hydrocarbon having a boiling point above about 200° F. said amounts of sulfur and petroleum hydrocarbon added being over and above any amount thereof present in said asphalt prior to said addition.

13. The method of claim 12 wherein the asphalt and sulfur are separately heated to above the melting point of said sulfur and below 300° F., combining and blending the heated materials, and adding and mixing said liquid petroleum hydrocarbon.

* * * * *